United States Patent
Proctor et al.

(10) Patent No.: US 8,418,135 B2
(45) Date of Patent: *Apr. 9, 2013

(54) METHOD AND APPARATUS TO ABSTRACT AWAY RULE LANGUAGES

(75) Inventors: Mark Proctor, Chiswick (GB); Edson Tirelli, São Paulo (BR); Robert K. McWhirter, Asheville, NC (US)

(73) Assignee: Red Hat, Inc., Raleigh, NC (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/809,468

(22) Filed: May 31, 2007

(65) Prior Publication Data
US 2008/0301078 A1 Dec. 4, 2008

(51) Int. Cl.
*G06F 9/44* (2006.01)

(52) U.S. Cl.
USPC ........... 717/117; 717/146; 717/136; 717/139; 717/144

(58) Field of Classification Search ........................ None
See application file for complete search history.

(56) References Cited

U.S. PATENT DOCUMENTS

| | | | | |
|---|---|---|---|---|
| 4,667,290 A * | 5/1987 | Goss et al. | | 717/147 |
| 4,910,691 A * | 3/1990 | Skeirik | | 706/45 |
| 5,197,116 A * | 3/1993 | Katoh et al. | | 706/48 |
| 5,228,116 A * | 7/1993 | Harris et al. | | 706/50 |
| 5,303,332 A * | 4/1994 | Kirk et al. | | 706/50 |
| 5,408,587 A * | 4/1995 | Maier et al. | | 706/46 |
| 5,452,453 A * | 9/1995 | Ando et al. | | 717/104 |
| 5,873,071 A * | 2/1999 | Ferstenberg et al. | | 705/36 R |
| 5,889,999 A * | 3/1999 | Breternitz et al. | | 717/158 |
| 5,974,405 A * | 10/1999 | McGuinness et al. | | 706/45 |
| 5,983,020 A * | 11/1999 | Sweeney et al. | | 717/141 |
| 5,999,179 A * | 12/1999 | Kekic et al. | | 715/734 |
| 6,021,266 A * | 2/2000 | Kay | | 716/103 |
| 6,110,226 A * | 8/2000 | Bothner | | 717/153 |
| 6,272,537 B1 * | 8/2001 | Kekic et al. | | 709/223 |
| 6,311,327 B1 * | 10/2001 | O'Brien et al. | | 717/114 |
| 6,405,162 B1 * | 6/2002 | Segond et al. | | 704/9 |
| 6,473,748 B1 * | 10/2002 | Archer | | 706/45 |
| 6,564,263 B1 * | 5/2003 | Bergman et al. | | 709/231 |
| 6,664,978 B1 * | 12/2003 | Kekic et al. | | 715/733 |
| 6,968,318 B1 * | 11/2005 | Ferstenberg et al. | | 705/37 |
| 7,020,869 B2 * | 3/2006 | Abrari et al. | | 717/108 |
| 7,117,488 B1 * | 10/2006 | Franz et al. | | 717/144 |
| 7,287,018 B2 * | 10/2007 | Lennon | | 707/694 |
| 7,376,939 B1 * | 5/2008 | Nayak et al. | | 717/144 |
| 7,590,647 B2 * | 9/2009 | Srinivasan et al. | | 1/1 |

(Continued)

OTHER PUBLICATIONS

Title: "Implementing XML Schema Naming and Design Rules", Extreme Markup Language, pp. 1-17, Author: Lubell et al, J ,dated: Aug. 11, 2006.*

(Continued)

*Primary Examiner* — Chameli Das
(74) *Attorney, Agent, or Firm* — Lowenstein Sandler LLP

(57) ABSTRACT

Some embodiments of a method and an apparatus to abstract away rule languages from a rule engine have been presented. In one embodiment, rules written in a first rule language are parsed into descriptor classes, which are used to model concepts that can be expressed in a rule engine. An intermediate structure is generated from the parsed rules. The intermediate structure is input to a core of the rule engine, which is operable to execute the rules.

12 Claims, 6 Drawing Sheets

U.S. PATENT DOCUMENTS

| | | | | |
|---|---|---|---|---|
| 7,603,358 | B1 * | 10/2009 | Anderson et al. | 1/1 |
| 7,698,684 | B2 * | 4/2010 | Baikov | 717/118 |
| 7,765,551 | B2 * | 7/2010 | Broberg | 718/104 |
| 2002/0053033 | A1 * | 5/2002 | Cooper et al. | 713/201 |
| 2003/0009298 | A1 * | 1/2003 | Pitman et al. | 702/27 |
| 2003/0172135 | A1 * | 9/2003 | Bobick et al. | 709/220 |
| 2003/0208473 | A1 * | 11/2003 | Lennon | 707/3 |
| 2004/0093559 | A1 * | 5/2004 | Amaru et al. | 715/502 |
| 2005/0108518 | A1 * | 5/2005 | Pandya | 713/151 |
| 2005/0262475 | A1 * | 11/2005 | Halpern | 717/114 |
| 2005/0289168 | A1 * | 12/2005 | Green et al. | 707/101 |
| 2006/0129978 | A1 * | 6/2006 | Abrari et al. | 717/110 |
| 2007/0073753 | A1 * | 3/2007 | Baikov | 707/101 |
| 2007/0074184 | A1 * | 3/2007 | Raghavan et al. | 717/138 |
| 2007/0234288 | A1 * | 10/2007 | Lindsey et al. | 717/117 |
| 2008/0046920 | A1 * | 2/2008 | Bill | 725/34 |
| 2008/0071693 | A1 * | 3/2008 | Ferstenberg et al. | 705/80 |
| 2008/0158605 | A1 * | 7/2008 | Engbrocks et al. | 358/1.18 |
| 2008/0177994 | A1 * | 7/2008 | Mayer | 713/2 |
| 2008/0216061 | A1 * | 9/2008 | Allen | 717/142 |
| 2009/0125892 | A1 * | 5/2009 | Crewdson | 717/136 |
| 2010/0057797 | A1 * | 3/2010 | Pitman et al. | 707/722 |
| 2011/0239188 | A1 * | 9/2011 | Lindsey et al. | 717/117 |

OTHER PUBLICATIONS

Title: Overlapping phrase-level translation rules in an SMT engine, author: Tribble, A et al, source: IEEE, dated: 2003.*

Title: Imbedding rule inferencing in applications, Franke, D.W source: IEEE, dated: 1990.*

"Base Semantic Module", accessed at: http://legacy.drools. codehaus.org/Base+Semantic+Module?print=1 on Aug. 8, 2007, 4 pages.

"Java Semantic Module", accessed at: http://legacy.drools.codehaus. org/Java+semantic+module?print=1 on Aug. 8, 2007, 3 pages.

"Groovy Semantic Module", accessed at: http://legacy.drools. codehaus.org/Groovy+Semantic+Module?print=1 on Aug. 8, 2007, 3 pages.

Office Action mailed Jul. 15, 2010 for U.S. Appl. No. 11/897,608, filed Aug. 31, 2007, 11 pages.

Simic, Goran, "The Multi-courses Tutoring System Design", ComSIS vol. 1, No. 1, Feb. 2004, pp. 141-155.

Lubell, Joshua et al., "Implementing XML Schema Naming and Design Rules", Extreme Markup Languages 2006, Montreal, Quebec, Canada, Aug. 7-11, 2006, 17 pages.

Nagl, Christoph et al., "ViDRE—A Distributed Service-Oriented Business Rule Engine based on RuleML", Proceedings of the 10th IEEE International Enterprise Distributed Object Computing Conference (EDOC'06), 2006, 10 pages.

Wagner, Gerd et al., "A Usable Interchange Format for Rich Syntax Rules Integrating OCL, RuleML and SWRL", WWW2006, May 22-26, 2006, Edinburgh, UK, 8 pages.

Proctor, Mark, "JBoss Drools 4.0 Released", accessed at: http://blog. athico.com/2007/07/jboss-drools-40-released.html on Jul. 28, 2010, last updated Jul. 25, 2007, 6 pages.

Proctor, Mark, "Pluggable Dialects for Drools Processes now work :)", accessed at: http://blog.athico.com/2007/11/pluggable-dialects-for-drools-processes.html on Jul. 28, 2010, last updated Nov. 27, 2007, 6 pages.

Proctor, Mark, "Why the MVEL scipting language for JBoss Rules", accessed at: http://blog.athico.com/2007/05/why-mvel-scipting-language-for-jboss.html on Jul. 28, 2010, last updated May 21, 2007, 6 pages.

"JBoss Rules", published Apr. 2007, 4 pages.

McWhirter, B., et al., "Current Core Committers", 2004, 25 pages.

Notice of Allowance mailed Oct. 28, 2010 for U.S. Appl. No. 11/897,608, filed Aug. 31, 2007, 8 pages.

Office Action mailed Dec. 3, 2010 for U.S. Appl. No. 11/809,608.

Office Action mailed Aug. 17, 2010 for U.S. Appl. No. 11/809,608.

Office Action mailed Jul. 15, 2010 for U.S. Appl. No. 11/809,608.

* cited by examiner

METHOD AND APPARATUS TO ABSTRACT AWAY RULE LANGUAGES

TECHNICAL FIELD

Embodiments of the present invention relate to artificial intelligence, and more specifically to rule engines.

BACKGROUND

Artificial Intelligence (A.I.) is a very broad research area that focuses on "making computers think like people" and includes disciplines like neural networks, genetic algorithms, decision trees, frame systems, and expert systems. Knowledge representation is the area of A.I. concerned with how knowledge is represented and manipulated. Expert systems use knowledge representation to facilitate the codification of knowledge into a knowledge-base, which can be used for reasoning, i.e., this knowledge-base is operable to process data to infer conclusions. Expert systems are also known as knowledge-based systems and knowledge-based expert systems and are considered applied artificial intelligence. The process of developing with an expert system is knowledge engineering.

Generally speaking, a rule is a logical construct for describing the operations, definitions, conditions, and/or constraints that apply to some predetermined data to achieve a goal. For example, a business rule might state that no credit check is to be performed on return customers.

Typically, a rule engine includes a suite of software modules or components that manages and automates the rules to implement the Expert System. For instance, the rule engine evaluates and fires one or more of the rules based on the evaluation. One advantage of a rule engine is the separation of the rules from the underlaying application code. For many applications, the rules change more frequently than the rest of the application code. With the rules separated from the application code, the rule engine allows the business users to modify the rules frequently without the help of technical staff and hence, allowing the applications to be more adaptable with the dynamic rules.

In general, rules are written in rule languages. However, conventional rule engines are typically not language-independent. In other words, a conventional rule engine typically supports only a limited number of rule languages. To migrate rules written in a rule language to a rule engine that does not support the rule language, the rules have to be manually rewritten in another rule language that is supported by the rule engine. This is a tedious and error-proned process.

DESCRIPTION OF THE DRAWINGS

The present invention is illustrated by way of example, and not by way of limitation, in the figures of the accompanying drawings and in which.

DETAILED DESCRIPTION

Figure 1:
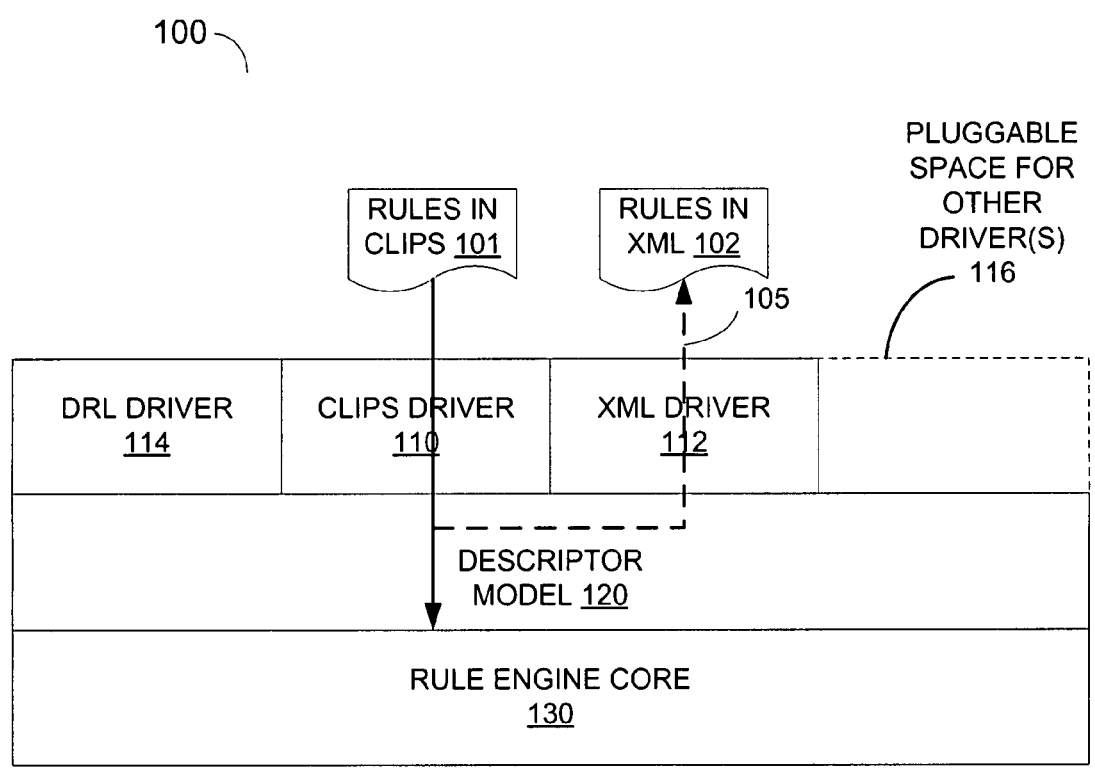
FIG. 1 illustrates the architecture of one embodiment of a rule engine.

Described herein are some embodiments of a method and apparatus to abstract away rule languages from a rule engine. In one embodiment, rules written in a first rule language are parsed into descriptor classes, which are used to model concepts that can be expressed in a rule engine. An intermediate structure is generated from the parsed rules. The intermediate structure is input to a core of the rule engine, which is operable to execute the rules. More details of some embodiments of the rule engine are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each couple to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Overview of a Rule

As mentioned above, a rule is a logical construct for describing the operations, definitions, conditions, and/or constraints that apply to some predetermined data to achieve a goal. In some embodiments, a rule is in the form of a two-part structure with a Left Hand Side (LHS) and a Right Hand Side (RHS). Further, a rule may have additional attributes, such as salience, agenda group, auto-focus, activation group, no-loop, duration, etc. In some embodiments, the LHS of a rule includes Conditional Elements (CE) and Patterns, which are used to facilitate the encoding of propositional and first order logic. The term Pattern is used to indicate Constraints on a fact type. Some examples of CEs include and, or, not, exist, forall, accumulate, etc. Some examples of Constraints include Literal Constraint, Bound Variable Constraint, Return Value, Predicate, etc.

As facts are asserted and modified in a working memory, a rule engine matches the facts against the LHS conditions of the rules. When all the LHS conditions of a rule are met and determined to be true, the rule and those matched facts are activated. When a rule is activated, the rule is placed onto an agenda of a rule engine for potential execution, where the Actions of the RHS of the rule, called the Consequence, are executed.

The language in which rules are written in is referred to as a rule language. Some examples of a rule language include Drool's Rule Language (DRL), Extensible Markup Language (XML), C Library Integrated Production System (CLIPS) language, etc. Below is an example of a rule written in CLIPS language:

```
(defrule likes-cheese
    (person (name ?name) (likes ?cheeseType))
    (cheese (type ?cheeseType))
=>
    (printout t ?name " likes " ?cheeseType " cheese." crlf))
```

The following example is the same rule written in DRL:

```
rule likes-cheese
when
    Person( $name : name, $cheeseType : likes )
    Cheese( type == $cheeseType )
then
    System.out.println($name+" likes "+$cheeseType+" cheese" );
end
```

In some embodiments, rules allow a complete de-coupling of data from the logic. Note that rules may not be called directly as they are not methods or functions. Instead, rules fire in response to changes in the data (e.g., facts in the working memory). Rules are also fully declarative in that they describe "what," not "how," like imperative languages, such as JAVA.

Overview of a Rule Engine

In some embodiment, a rule engine has two main parts, namely authoring and runtime. Authoring involves the creation of files for rules. The files for rules are processed as described below to generate packages, which are loaded into a runtime of the rule engine. The runtime of the rule engine is also referred to as RuleBase. More details of authoring and RuleBase are discussed below.

Authoring

As mentioned above, authoring involves the creation of files for rules. FIG. 1 shows an architecture of one embodiment of a rule engine usable in authoring. The architecture 100 includes a CLIPS driver 110, an XML driver 112, a DRL driver 114, a descriptor model 120, and a core of the rule engine (hereinafter, the rule engine core) 130. The CLIPS driver 110, the XML driver 112, and the DRL driver 114 are examples of rule language drivers. It should be apparent that other embodiments may include other types of rule language drivers. Further, there is a pluggable space 116 above the descriptor model 120 for other rule language driver(s). Thus, the architecture 100 is extensible to support other types of rule languages by adding the corresponding rule language drivers to the pluggable space 116.

Beneath the rule language drivers 110, 112, and 114 sits the descriptor model 120. The descriptor model 120 acts as an interface between the rule engine core 130 and the rule language drivers 110 and 112. The descriptor model 120 contains a set of predefined descriptor classes, like RuleDescr, ConditionalElementDescr, ConstraintDescr, etc., which are used to model concepts that can be expressed in the rule engine. To illustrate how the components within the architecture 100 work with each other, one example is discussed in details below.

In some embodiments, a file for rules written in CLIPS 101 is input to the CLIPS driver 110. The CLIPS driver 110 parses the file 101 that contains a set of rule. In addition, the CLIPS driver 110 uses the descriptor classes from the descriptor model 120 to convert the content of the file 101 from CLIPS into the descriptor classes in order to produce an intermediate structure usable by the rule engine core 130. In some embodiments, the intermediate structure includes an abstract syntax tree (AST). The intermediate structure may be referred to as a "descr" AST, where "descr" indicates the AST describes the rules.

The intermediate structure is then input to the rule engine core 130, which is operable to execute the rules. Thus, using the descriptor model 120, rule languages are abstracted away from the rule engine core 130. In other words, the rule engine core 130 may support any rule language by implementing a driver that parses rules written in the rule language into the descriptor classes.

Furthermore, a round-trip translation of the file 101 into a second rule language (which is XML in the current example) may be supported. The intermediate structure, which is generated from the rules in CLIPS 101 using descriptor classes, is input to the XML driver 112 as indicated by the dashed line 105. The XML driver 112 translates the descriptor classes in the intermediate structure into XML and outputs a file 102 for the rules in XML. Thus, the architecture 100 allows the rule engine to automatically transform rules written in a first rule language into a second rule language. As a result, rules written in the second rule language may be readily migrated to the rule engine by coding a rule language driver that supports parsing the second rule language into the descriptor classes, and vice versa.

Figure 2:
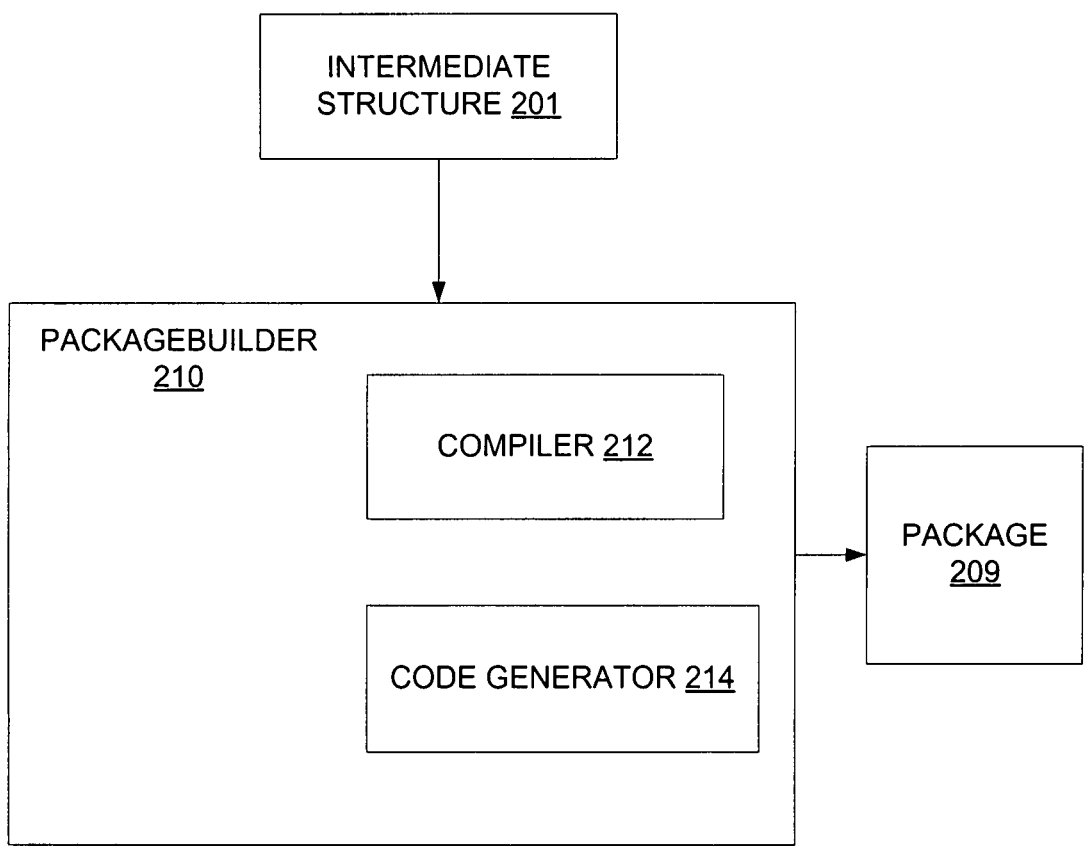
FIG. 2 illustrates one embodiment of a PackageBuilder.

In some embodiments, the intermediate structure is then passed to a PackageBuilder within the rule engine core 130 to produce packages. A package is a self-contained, deployable, and serializable object, having one or more rules. A package may also be referred to as a rule set. A package may declare imports, global variables, functions, and rules. In some embodiments, rules are associated with a namespace via a package keyword. FIG. 2 shows one embodiment of a PackageBuilder. The PackageBuilder 210 includes a compiler 212 and a code generator 214. An intermediate structure 201 is input to the PackageBuilder 210. The compiler 212 compiles the intermediate structure 201. Further, the code generator 214 may generate code based on the intermediate structure 201, if needed. Using the compiler 212 and the code generator 214, the PackageBuilder 210 produces a package 209 from the intermediate structure 201. The package 209 may be loaded into a runtime of the rule engine. More details of the runtime are discussed below.

In some embodiments, the PackageBuilder 210 provides convenience APIs (also referred to as convenience methods). Some examples of the convenience methods include "addPackageFromDrl" and "addPackageFromXml."

In some embodiments, the PackageBuilder 210 is configurable using PackageBuilderConfiguration. PackageBuilderConfiguration has default values that may be overriden programmatically via setters and/or on first use via property settings. Further, one embodiment of PackageBuilderConfiguration allows alternative compilers (e.g., Janino, Eclipse JAVA Development Tool (JDT), etc.) and different JAVA Development Kit (JDK) source levels (e.g., "1.4," "1.5," etc.) to be specified. PackageBuilderConfiguration may further include a parent class loader. In one embodiment, the default compiler is Eclipse JDT Core at source level "1.4" with the parent class loader set to "Thread.currentThread( )getContextClassLoader( )". In some embodiments, the compiler may be specified programmatically. Alternatively, the compiler may be specified with a property file setting.

Figure 3:
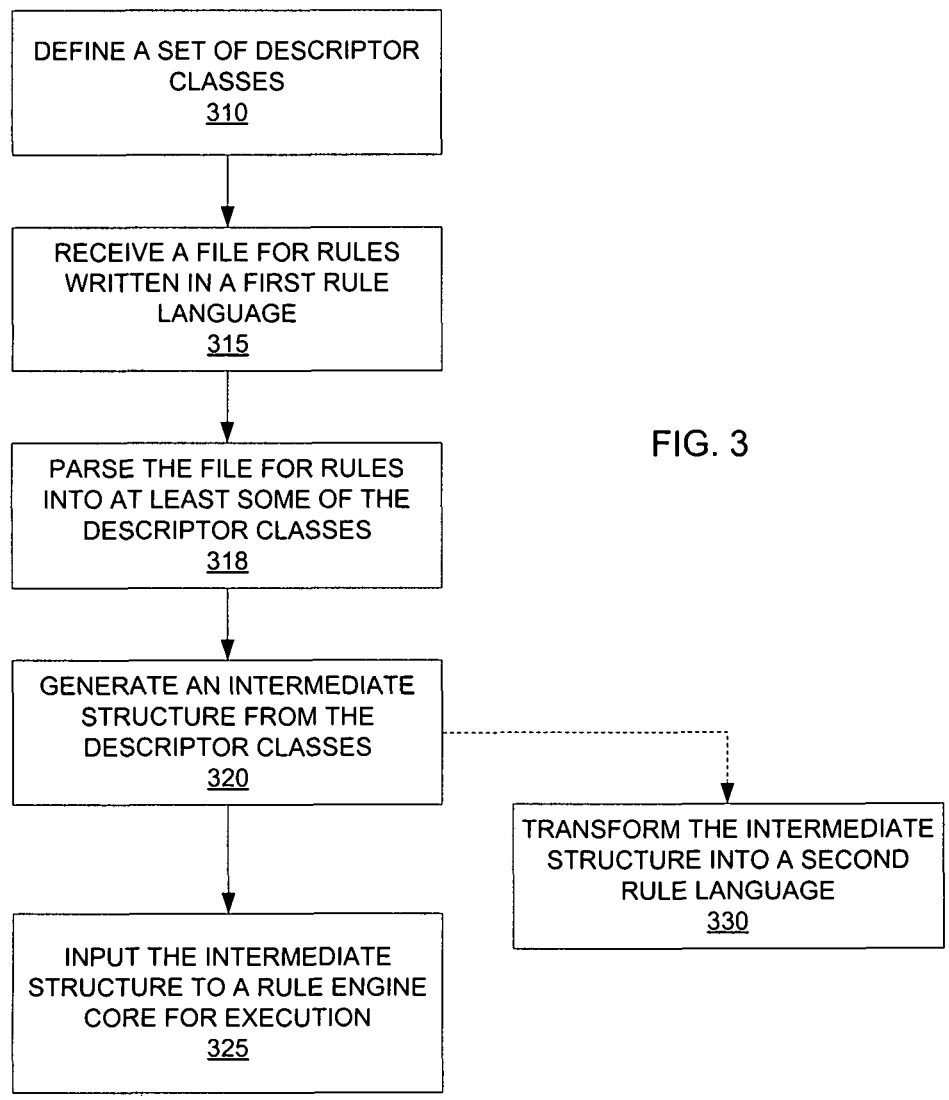
FIG. 3 shows one embodiment of a process to abstract away rule languages from a rule engine.

FIG. 3 illustrates one embodiment of a process to abstract away rule languages from a rule engine. The process may be performed by processing logic that may comprise hardware (e.g., circuitry, dedicated logic, programmable logic, microcode, etc.), software (such as instructions run on a processing device), firmware, or a combination thereof. For example, the rule engine 100 hosted by the computer system 700 in FIG. 7 may perform at least part of the process in some embodiments.

Referring to FIG. 3, processing logic defines a set of descriptor classes (processing block 310). The descriptor classes are used to model concepts that can be expressed in the rule engine. Processing logic may put the descriptor classes into a descriptor model, such as the descriptor model 120 in FIG. 1. When processing logic receives a file for rules written in a first rule language (processing block 315), processing logic parses the file for rules into at least some of the descriptor classes (processing block 318). Then processing logic generates an intermediate structure from the descriptor classes for the file (processing block 320). The intermediate structure is in a form usable by the rule engine. Then processing logic inputs the intermediate structure to a rule engine core of the rule engine for execution of the rules.

In addition, processing logic may support an optional feature of transforming the file for rules into a second rule language. Specifically, processing logic may perform processing blocks 310, 315, 318, and 320 as discussed above. Then processing logic transforms the intermediate structure into the second rule language (processing block 330). For example, processing logic may use a parser supporting the second rule language to transform the descriptor classes of the intermediate structure into the second rule language.

RuleBase

As mentioned above, a RuleBase is the runtime of a rule engine. A RuleBase loads one or more packages ready to be used. The rules may have been validated and/or compiled during authoring as described above. In some embodiments, a RuleBase is serializable so it can be deployed to services, such as JAVA Naming and Directory Interface (JNDI). In some embodiments, a RuleBase is generated and cached on first use in order to save on the continual re-generation of the RuleBase, which is expensive. A RuleBase is instantiated using a RuleBaseFactory. In some embodiments, the RuleBaseFactory returns a Rete Object-Oriented (ReteOO) RuleBase by default. Arguments can be used to specify ReteOO or Leaps. Packages (such as the package 209 in FIG. 2) are loaded into the RuleBase, in turn, using an addPackage method. Packages of any namespace and multiple packages of the same namespace may be added. In some embodiments, packages can be added and removed at any time. All changes may be propagated to the existing working memories. Then fireAllRules( )may be called to fire the resulting Activations.

In some embodiments, an individual rule cannot be added to a working memory by itself. In order to add an individual rule, a new package containing the individual rule is created and then added to the working memory.

In some embodiments, a RuleBase instance is threadsafe, in the sense that one rule instance may be shared across multiple threads in an application (e.g., a web application). One common operation on a RuleBase is to create a new working memory.

A RuleBase may hold weak references to any working memories that the RuleBase has instantiated. Thus, if rules are changed, added, removed, etc., the rules in the working memory can be updated with the latest rules without having to restart the working memory. Alternatively, a RuleBase may not hold any weak reference to a working memory if the RuleBase cannot be updated.

Working Memory

In some embodiments, a working memory is the main class for using the rule engine at runtime. The working memory holds references to data (i.e., facts) that has been "asserted" into the working memory (until retracted). Further, the working memory is the place where the interaction with the application occurs. Working memories are stateful objects. They may be shortlived, or longlived. If a rule engine is executed in a stateless manner, then a RuleBase object is used to create a new working memory for each session, and the working memory is discarded when the session is finished. Note that creating a working memory is typically a low cost operation. In an alternative approach, a working memory is kept around for a longer time (such as a conversation) and kept updated with new facts. To dispose of a working memory, a dispose( ) method may be used. The dispose( ) method removes the reference from the parent RuleBase. Since this is a weak reference (as discussed above in the section on RuleBase), the reference would eventually be garbage collected. The term working memory action may refer to assertions, retractions, and/or modifications of facts in the working memory.

Assertion

Assertion broadly refers to the act of telling a working memory about a set of facts. One example to assert a fact, "yourObject," to a working memory is "WorkingMemory.assertObject(yourObject)." When a fact is asserted in a working memory, the fact is examined for matches against rules in the working memory. Thus, all of the work may be done during assertion; however, in some embodiments, no rules are executed until "fireAllRules( )" is called after asserting the facts.

When a fact is asserted in a working memory, the rule engine returns a FactHandle. This FactHandle is a token used to represent the asserted fact inside the working memory. The FactHandle is also a reference to the fact by which one may interact with the working memory when retracting and/or modifying the fact.

Retraction

"Retraction" generally refers to causing a rule engine not to track or match a fact previously asserted into a working memory. In other words, when a fact is retracted from the working memory, the rule engine no longer tracks and matches that fact, and any rules that are activated and dependent on that fact may be cancelled. Note that it is possible to have rules that depend on the "non-existence" of a fact, in which case retracting a fact may cause a rule to activate (e.g., rules having the "not" and "exist" keywords). Retraction is done using the FactHandle that has been returned during the assertion.

Modification

Modification broadly refers to changing a fact. In general, a rule engine has to be notified of modified facts, so that the modified facts can be re-processed. In some embodiments, a modification includes a retraction followed by an assertion such that the modification clears the working memory and then starts again. One way to perform a modification is to use a modifyObject method to notify the working memory of changed objects that are not able to notify the working memory themselves. In some embodiments, modifyObject takes the modified object as a second parameter, so that new instances for immutable objects may be specified.

Agenda

During a single working memory action, multiple rules may become fully matched and eligible for execution. When a rule is fully matched, the rule is activated by creating an activation to reference the rule and the matched facts. Conventionally, activations are placed onto the Agenda, which controls the execution order of these activations using a conflict resolution strategy.

Production Rule System

Figure 4:
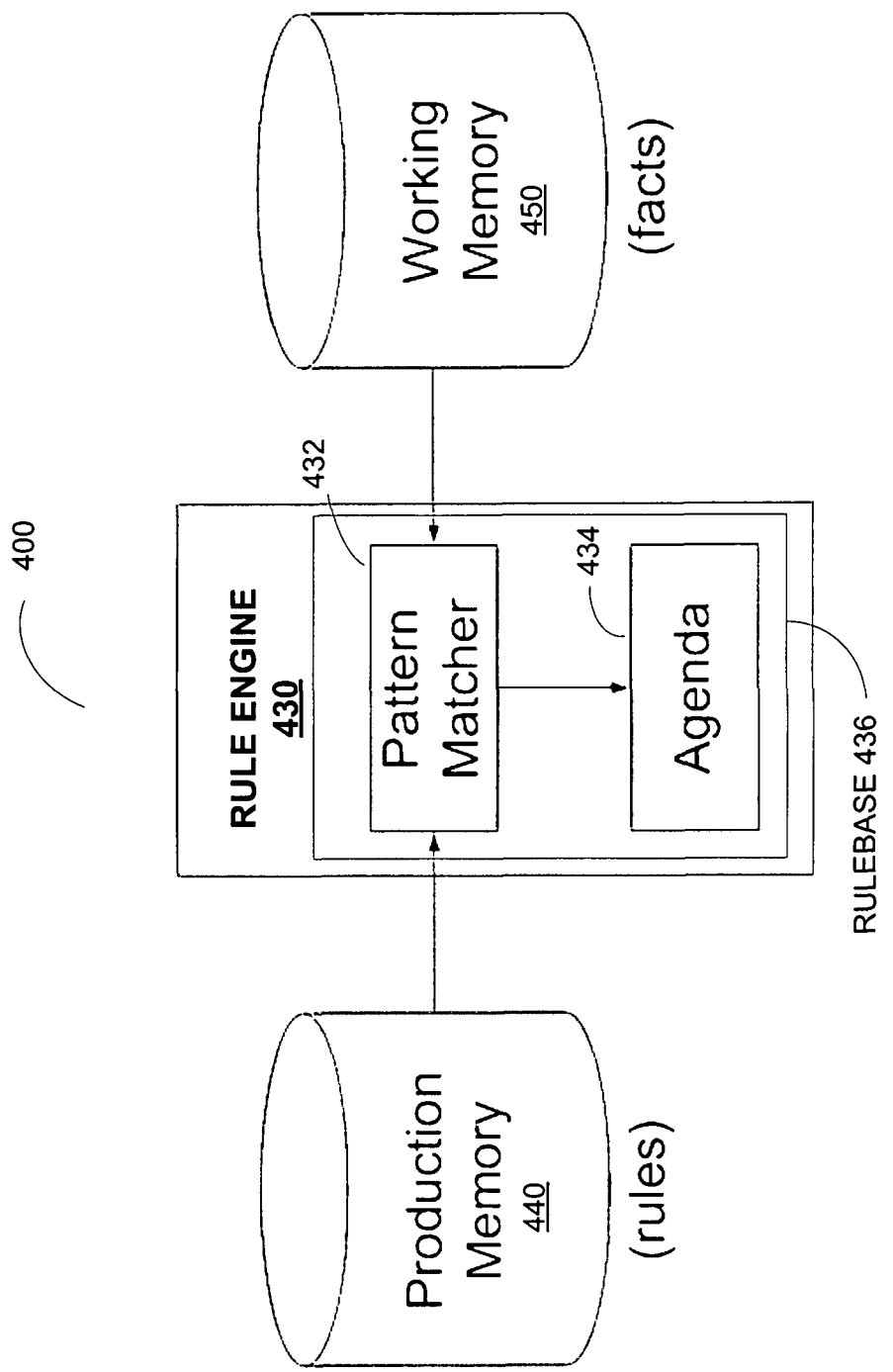
FIG. 4 shows one embodiment of a Production Rule System.

In some embodiments, a production rule system is an expert system adopting a rule-based approach. FIG. 4 illustrates one embodiment of a production rule system. The Production Rule System 400 includes a Rule Engine 430, a Working Memory 450, and a Production Memory 440. The Working Memory 450 stores facts, while the Production Memory 440 stores rules. As discussed above, facts are application data passed from an application as objects (e.g., JAVA beans) and asserted into the Working Memory 450. After being asserted into the Working Memory 450, the facts are accessible by the rules. In some embodiments, the Rule Engine 430 uses references and/or pointers to access the facts.

The brain of the Production Rules System 400 is the Rule Engine 430, which is scalable to a large number of rules and facts. A runtime of the Rule Engine 430 is a RuleBase 436. The RuleBase 436 includes a Pattern Matcher 432 and an Agenda 434. The Pattern Matcher 430 matches the facts against the rules to infer conclusions, which result in Actions. That is, when the LHS conditions of a rule are satisfied by the facts, the rule and the relevant facts are activated and placed onto the Agenda 434 to be executed.

System Architecture

Figure 5:
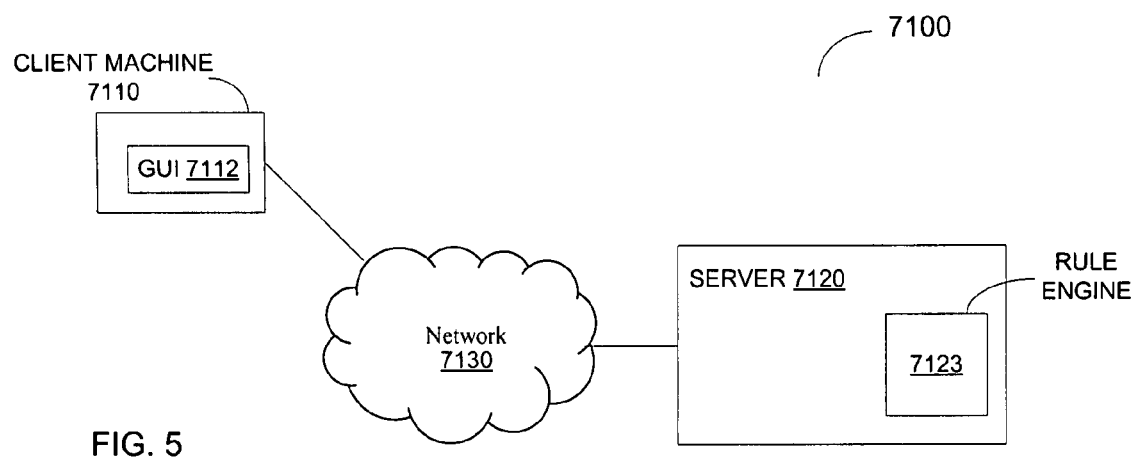
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having an architecture as illustrated in FIG. 1. The client machine 7110 may present a GUI 7112 (e.g., a web-page rendered by a browser) to allow users to input files for rules, which may be sent to the server 7120 to be processed as discussed above.

Figure 6:
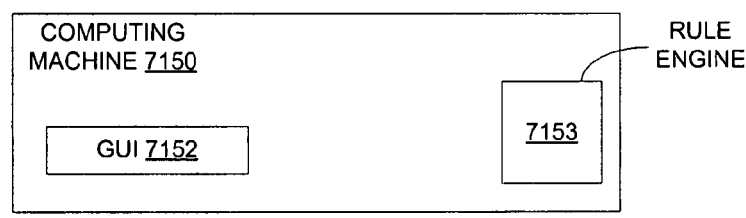
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. In some embodiments, users may input files for rules using the GUI 7152. Then the files may be processed by rule engine 7153 as discussed above.

Figure 7:
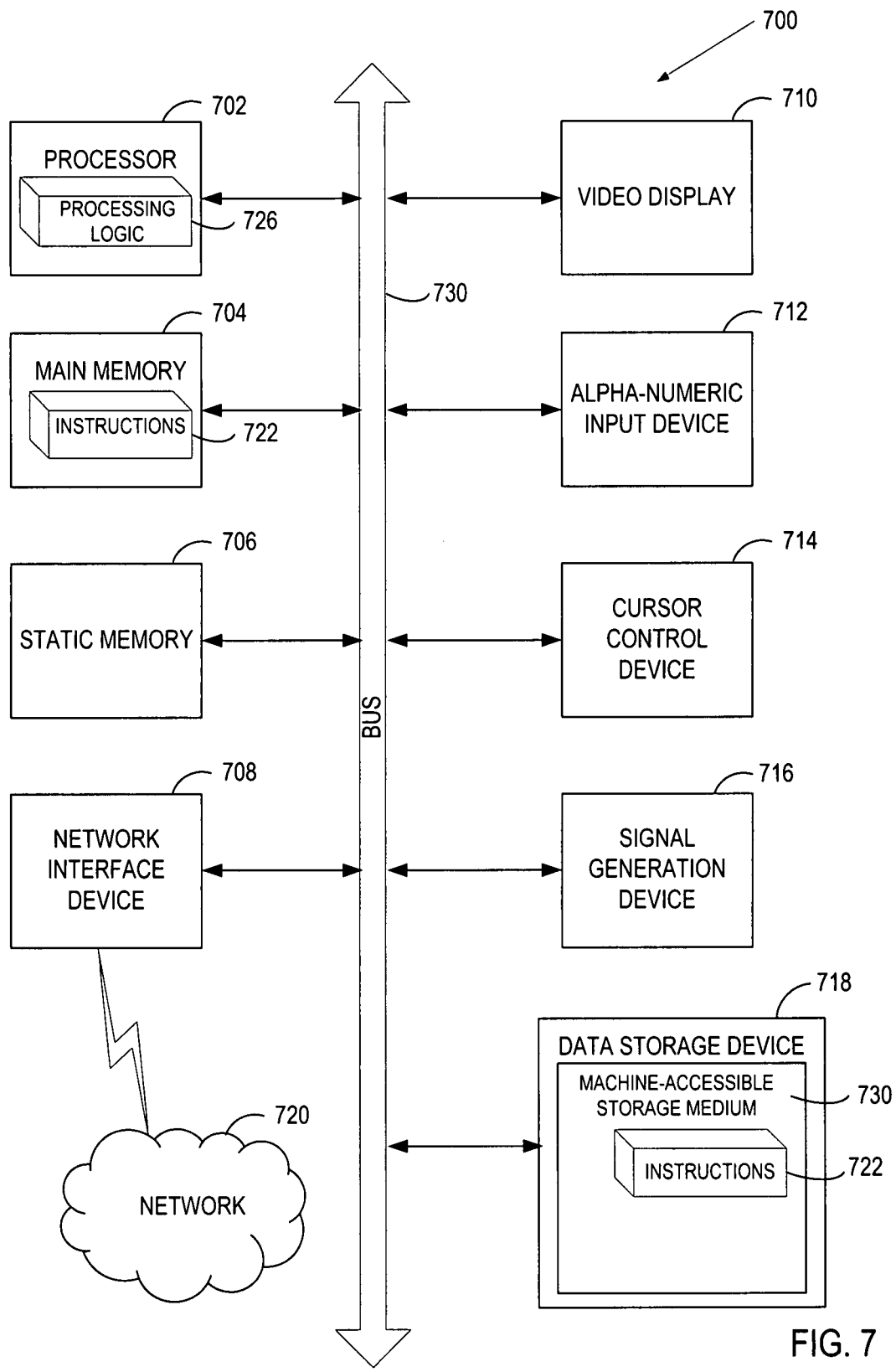
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a machine-readable storage medium) on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to abstract away rule languages from a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   identifying, by a first driver executed by a processing device, a first file comprising a first plurality of rules written in a first rule language, wherein the first driver corresponds to the first rule language;
   converting, by the first driver, the first plurality of rules written in the first rule language into a plurality of descriptor classes using a plurality of rule patterns, wherein the plurality of descriptor classes are used to model rule concepts supported by a rule engine;
   generating, by the first driver, an intermediate structure comprising an abstract syntax tree of the plurality of descriptor classes;
   inputting, by the processing device, the intermediate structure to a second driver, wherein the second driver corresponds to a second rule language;
   translating, by the second driver executed by the processing device, the plurality of descriptor classes in the abstract syntax tree in the intermediate structure into a second plurality of rules written in the second rule language; and
   generating, by the second driver, a second file comprising the second plurality of rules written in the second rule language.

2. The method of claim 1, wherein the plurality of descriptor classes comprises at least one of RuleDescr, ConditionalElementDescr, or ConstraintDescr.

3. The method of claim 1, wherein the first rule language is a C Library Integrated Production System (CLIPS) language.

4. The method of claim 1, wherein the first rule language is Extensible Markup Language (XML).

5. An apparatus comprising:
   a storage device to store a descriptor model having a plurality of descriptor classes, wherein the plurality of descriptor classes are used to model rule concepts supported by a rule engine;
   a processing device coupled to the storage device to
   execute a first driver to identify a first file comprising a first plurality of rules written in a first rule language, wherein the first driver corresponds to the first rule language, convert the first plurality of rules written in the first rule language into the plurality of descriptor classes using a plurality of rule patterns, and generate an intermediate structure comprising an abstract syntax tree of the plurality of descriptor classes,
   input the intermediate structure second driver, wherein the second driver corresponds to a second rule language; and
   execute the second driver to translate the plurality of descriptor classes in the abstract syntax tree in the intermediate structure into a second plurality of rules written in the second rule language and generate a second file comprising the second plurality of rules written in the second rule language.

6. The apparatus of claim 5, wherein the plurality of descriptor classes comprises at least one of RuleDescr, ConditionalElementDescr, or ConstraintDescr.

7. The apparatus of claim 5, wherein the first driver comprises a C Library Integrated Production System (CLIPS) driver.

8. The apparatus of claim 5, wherein the first driver comprises an Extensible Markup Language (XML) driver.

9. A non-transitory machine-readable medium that stores instructions that, if executed by a processing device, will cause the processing device to perform operations comprising:
   identifying, by a first driver executed by the processing device, a first file comprising a first plurality of rules written in a first rule language, wherein the first driver corresponds to the first rule language;
   converting, by the first driver, the first plurality of rules written in the first rule language in a plurality of descriptor classes using a plurality of rule patterns, wherein the plurality of descriptor classes are used to model rule concepts supported by a rule engine;
   generating, by the first driver, an intermediate structure comprising an abstract syntax tree of the plurality of descriptor classes;
   inputting, by the processing device, the intermediate structure to a second driver, wherein the second driver corresponds to a second rule language;
   translating, by the second driver executed by the processing device, the plurality of descriptor classes in the abstract syntax tree in the intermediate structure into a second plurality of rules written in the second rule language; and
   generating, by the second driver, a second file comprising the second plurality of rules written in the second rule language.

10. The non-transitory machine-readable medium of claim 9, wherein the plurality of descriptor classes comprises at least one of RuleDescr, ConditionalElementDescr, or ConstraintDescr.

11. The non-transitory machine-readable medium of claim 9, wherein the first rule language is a C Library Integrated Production System (CLIPS) language.

12. The non-transitory machine-readable medium of claim 9, wherein the first rule language is Extensible Markup Language (XML).

* * * * *